(12) United States Patent
Weisenburger et al.

(10) Patent No.: US 7,064,709 B1
(45) Date of Patent: Jun. 20, 2006

(54) SYSTEM AND METHOD FOR GPS NAVIGATION BEFORE SIGNAL BIT SYNCHRONIZATION

(75) Inventors: Shawn Weisenburger, Calgary (CA); Charles Norman, Huntington Beach, CA (US)

(73) Assignee: RF Micro Devices, Inc., Greensboro, NC (US)

(*) Notice: Subject to any disclaimer, the term of this patent is extended or adjusted under 35 U.S.C. 154(b) by 0 days.

(21) Appl. No.: 11/082,276

(22) Filed: Mar. 17, 2005

(51) Int. Cl.
*G01S 5/02* (2006.01)
*H04B 7/185* (2006.01)

(52) U.S. Cl. .............................. 342/357.12; 342/357.06
(58) Field of Classification Search ............ 342/357.01, 342/357.06, 357.12, 357.15; 701/207, 213, 701/215
See application file for complete search history.

(56) References Cited

U.S. PATENT DOCUMENTS

| 5,786,790 | A | * | 7/1998 | Abbott | ................. | 342/357.02 |
|---|---|---|---|---|---|---|
| 6,516,021 | B1 | * | 2/2003 | Abbott et al. | ............... | 375/150 |
| 6,618,670 | B1 | | 9/2003 | Chansarkar | ................. | 701/213 |
| 6,734,821 | B1 | * | 5/2004 | van Diggelen | ......... | 342/357.12 |
| 2005/0225483 | A1 | * | 10/2005 | Abraham et al. | ...... | 342/357.15 |

\* cited by examiner

*Primary Examiner*—Dao L. Phan
(74) *Attorney, Agent, or Firm*—Withrow & Terranova, PLLC

(57) ABSTRACT

A system and method are provided for determining a position of a Global Positioning System (GPS) receiver prior to bit and frame synchronization. As such, the time-to-first-fix is substantially reduced. More specifically, pseudoranges to five GPS satellites are measured by correlating locally generated Pseudo-Random Number (PRN) codes with signals received from the GPS satellites. After correlation, the pseudorange measurements are correct with an unknown integer number of milliseconds error, which is different for each of the pseudorange measurements. Using the measurements of the pseudoranges and a mathematical model where each of the pseudorange measurements is forced to have a common channel time error, the user position and the common channel time error are determined prior to bit and frame synchronization.

24 Claims, 3 Drawing Sheets

SYSTEM AND METHOD FOR GPS NAVIGATION BEFORE SIGNAL BIT SYNCHRONIZATION

FIELD OF THE INVENTION

The present invention relates to a Global Positioning System (GPS) receiver, and more particularly relates to a system and method for determining the position of the GPS receiver prior to performing bit and frame synchronization.

BACKGROUND OF THE INVENTION

The Global Positioning System (GPS) is based on an earth-orbiting constellation of twenty-four satellites, each broadcasting its precise location and ranging information. From any location on or near the earth, a GPS receiver with an unobstructed view of the sky should be able to track at least four satellites thereby being able to calculate the receiver's precise latitude, longitude, and elevation. Each satellite constantly transmits two frequencies, generally referred to as L1 and L2. The L1 signal from a satellite contains a unique pseudo-random noise code ranging signal with a chipping frequency of 1.023 MHz, a Navigation Message with a bit rate frequency of 50 Hz, and an encrypted precise-code (y-code) with a chipping frequency of 10.23 MHz, all being modulated onto a carrier frequency of 1575.42 MHz. The L2 signal consists of the Navigation Message and y-code being modulated onto a carrier frequency of 1227.60 MHz.

In order to calculate a three-dimensional location, a receiver must determine the distance, or pseudorange, from itself to each of at least four satellites. However, in a typical GPS receiver, a pseudorange cannot be used until the signal is found by correlating a locally generated Pseudo-Random Noise (PRN) code with the signal received from the satellite, the correct navigation bit edge is identified (bit synchronization), and the navigation data frame is identified (frame synchronization). Depending on many factors, bit synchronization may take up to one second, and frame synchronization may take at least six seconds. Further, bit and frame synchronization may not be possible when received signals are weak. Thus, to determine an initial position after startup, the receiver may take more than six seconds to compute its position, and may not be capable of computing its position when received signals are weak.

For many reasons and in many applications, it is desirable to compute the location of the receiver as soon as possible after start-up. Thus, there remains a need for a GPS receiver capable of computing its position before bit and frame synchronization.

SUMMARY OF THE INVENTION

The present invention provides a system and method for determining a user parameter, such as user position, of a Global Positioning System (GPS) receiver prior to, or without, bit and frame synchronization. As such, the time-to-first-fix is substantially reduced. In situations where the received signals are too weak to perform bit and frame synchronization, the present invention allows the computation of user position that would otherwise be impossible. More specifically, pseudoranges to a number of GPS satellites are measured by correlating locally generated Pseudo-Random Noise (PRN) codes with signals received from the GPS satellites. After correlation and prior to bit and frame synchronization, the pseudorange measurements have an unknown integer number of milliseconds error, which is different for each of the pseudorange measurements. Using the measurements of the pseudoranges and a mathematical model where each of the pseudorange measurements is forced to have a common channel time error, the user position and the common channel time error are determined prior to bit and frame synchronization.

In order to force each of the pseudorange measurements to have the common channel time error, the mathematical model uses an offset term for each of the pseudorange measurements corresponding to an offset in the pseudorange measurement due to the difference between an actual channel time error for the pseudorange measurement and the common channel time error. The offset terms are determined based on the pseudorange measurements, a known estimate of the user position and time, and known estimates of the positions of the five GPS satellites.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
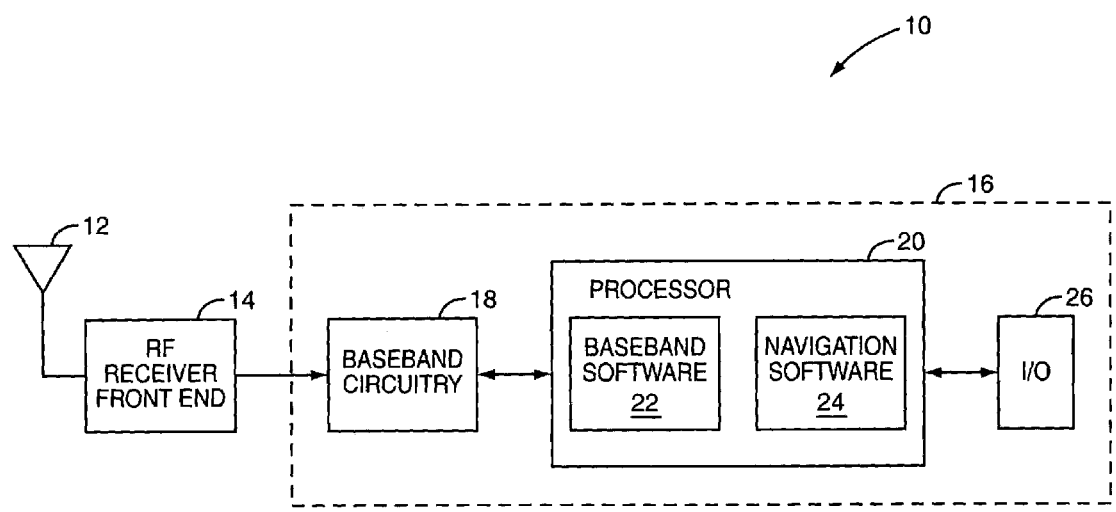
FIG. 1 is a basic block diagram of an exemplary Global Positioning System (GPS) receiver.

FIG. 1 is a basic block diagram of an exemplary Global Positioning System (GPS) receiver 10. While the present invention is described herein as applying to the GPS, the present invention may be used in any satellite positioning system, as will be apparent to one of ordinary skill in the art upon reading this disclosure. In general, the GPS receiver 10 includes an antenna 12, a receiver front end 14, and baseband processing system 16. In operation, the GPS receiver 10 receives signals from one or more GPS satellites via antenna 12. The receiver front end 14 operates to amplify and filter the received signals, as is well understood in the art. In addition, the receiver front end 14 may downconvert the received signals to an intermediate frequency or baseband frequency, and digitize the downconverted signals, as is also well understood in the art. The baseband processing system 16 processes the digitized signals from the receiver front end 14 to compute a position of the GPS receiver 10.

More specifically, the baseband processing system 16 may be integrated into a single semiconductor die and include baseband circuitry 18, a processor 20 operating according to baseband software 22 and navigation software 24, and a GPS interface (I/O) 26 that provides an interface to an external device. In general, the baseband circuitry 18 may decimate the digitized signals from the receiver front end 14. In addition, if the digitized signals from the receiver front end 14 are at a frequency other than baseband, the baseband circuitry 18 may downconvert the digitized signals to baseband. After decimation, and optionally downconversion, the baseband circuitry 18 correlates the received signals with locally generated pseudo random noise (PRN) codes corresponding to the PRN codes of the GPS satellites. The PRN codes are also known as coarse acquisition (C/A) codes. As discussed below in more detail, the correlation process provides pseudorange measurements that are correct modulo an integer number of milliseconds. The correlation process may alternatively be performed by the baseband software 22, which also performs bit and frame synchronization in order to receive the Navigation Message communicated in the received signals. As used herein, "correlator" is defined as either a hardware implementation of a correlator in the baseband circuitry 18 or a software implementation of a correlator in the baseband software 22 and performed by the processor 20.

According to the present invention, the correlation process is continued until five or more pseudoranges are generated. The baseband software 22 communicates the pseudoranges to the navigation software 24, which processes the pseudoranges for the GPS satellites to compute the position of the GPS receiver 10 prior to bit and frame synchronization. It should also be noted that, if an estimate of user altitude is known, the present invention provides a method for computing user position based on four or more pseudoranges, as will be apparent to one of ordinary skill in the art upon reading this disclosure. Also, user position is an exemplary user parameter that may be computed according to the present invention. Other user parameters that may alternatively or additionally be computed include user clock error for timing applications and a difference between actual and computed pseudoranges.

Figure 2:
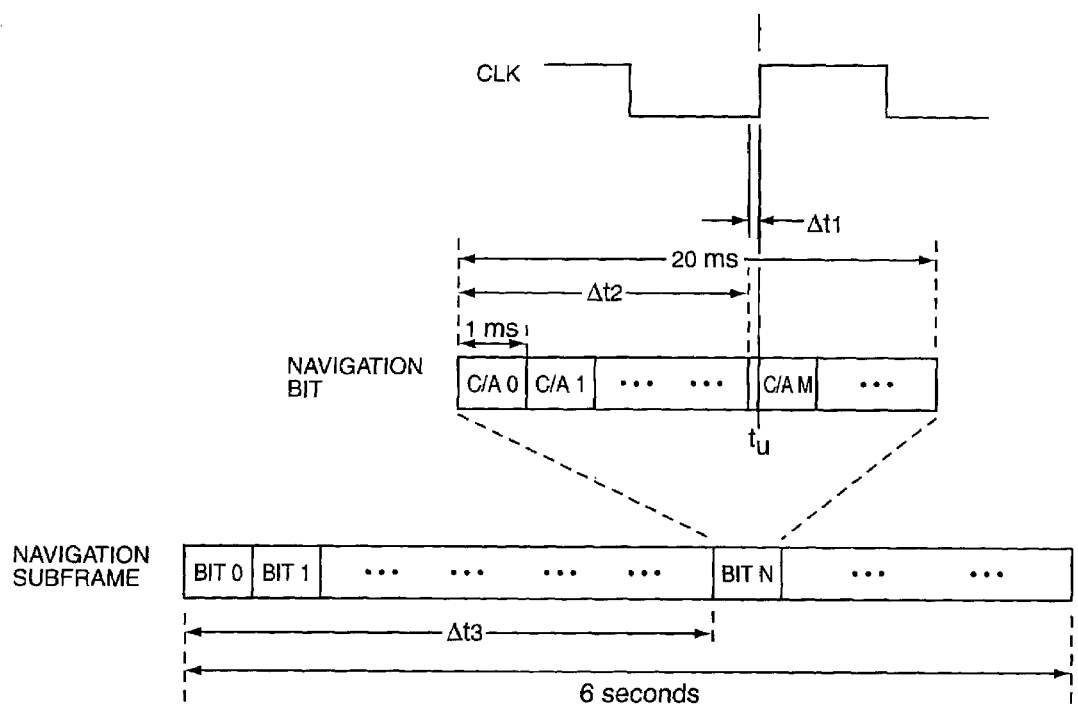
FIG. 2 illustrates an exemplary pseudorange construction.

Before further discussing the present invention, an exemplary pseudorange construction and the operation of a typical GPS receiver are discussed with respect to FIG. 2. In general, the Navigation Message communicated from a particular satellite in the GPS constellation includes numerous subframes. Each of the subframes is six seconds long and includes 300 data bits. Because the bit rate of the data bits is 50 Hz, the width of each of the data bits is 20 ms. Further, because the C/A code repeats every 1 ms, the C/A code is repeated twenty times during each data bit of each subframe of the Navigation Message. To show this, FIG. 2 shows twenty 1 ms C/A code time slots during each data bit. Satellite time, or Z-count, is transmitted in each subframe and is referenced to bit 0 of the subframe.

In operation, when performing an initial search for signals from the satellites in the GPS constellation, the GPS receiver begins to correlate a locally generated C/A code with a downconverted version of the received signals. The received signals may include signals from numerous satellites in the GPS constellation. Assuming that the locally generated C/A code corresponds to a C/A code of one of the received signals, the GPS receiver essentially slews the locally generated C/A code until the locally generated C/A code is aligned with the C/A code of the received signal. This is typically done using a correlation process and searching for a correlation peak. The point in time when the correlation peak occurs is the arrival time ($t_u$) of the received signal. The arrival time ($t_u$) is defined by a transition of the receiver clock (CLK) and is the time at which a particular C/A code is received by the receiver.

The arrival time ($t_u$) may occur at any point in time during any bit of any subframe of the Navigation Message. Because the satellite time, or Z-count, communicated in each subframe is referenced to bit 0 of the subframe, a typical GPS receiver must determine an offset between the arrival time ($t_u$) and bit 0 of the subframe before computing the position of the receiver, or user position. The offset between the arrival time ($t_u$) and bit 0 of the subframe is typically determined by performing correlation, bit synchronization, and frame synchronization. Bit synchronization and frame synchronization must also be performed in order to acquire the satellite time, or Z-count, from the Navigation Message.

Correlation provides a first time offset ($\Delta t1$), which is in the range of 0 to one millisecond, and corresponds to an amount of time by which the local PRN code was offset in order to align with the PRN code of the received signal. The first time offset ($\Delta t1$) is also referred to herein as a correlation time offset. Bit synchronization is performed to determine the number of whole 1 ms C/A code timeslots between arrival time ($t_u$) and the beginning of the corresponding data bit of the Navigation Message. For the illustrated example, the arrival time occurs during the Mth C/A code timeslot. The first time offset ($\Delta t1$) provided by the correlation process is offset between the arrival time and the beginning of the Mth C/A code timeslot. Bit synchronization provides a second time offset ($\Delta t2$) corresponding to a time offset between the beginning of the Mth C/A code timeslot and the beginning of bit N. The second time offset ($\Delta t2$) is equal to M milliseconds. Frame synchronization provides a third time offset ($\Delta t3$) between the beginning of bit N and the beginning of the subframe, which is the beginning of bit 0. The third time offset ($\Delta t3$) is equal to 20*N milliseconds.

According to FIG. 2, the pseudorange (R) may be measured according to the following equations:

$R(t)=c \cdot [t_u(t)-t_s(t-\tau)]$, where $t_s(t-\tau)=$"Z-count"+synchronization_offset, and synchronization_offset=$\Delta t1+\Delta t2+\Delta t3$ milliseconds.

Thus, for typical GPS receivers, bit synchronization and frame synchronization, which typically require six seconds, must be performed before the user position can be computed.

The present invention provides a system and method for determining the user position prior to bit and frame synchronization. In general, the GPS receiver 10 performs a coarse search for signals using any known correlation scheme. As a result, the first time offset ($\Delta t1$) for each of the signals found during the correlation process is determined. The first time offsets ($\Delta t1$) are then used to provide measurements of the pseudoranges (R) from each of the satellites. The user position may be calculated based on forcing each of the pseudorange measurements to have a common channel time error (m), where the channel time error (m) is an integer number of milliseconds that when summed with the first time offset ($\Delta t1$), which is a value between zero and one millisecond, provides the amount of time between transmission by the satellite and reception by the receiver.

In general, the pseudorange (R) may be defined as:

$$R(t)=p(t)+dT+\epsilon,$$

where p(t) is the true range, dT is an error of the receiver clock, which is also called the user clock bias, and $\epsilon$ is an error term for errors such as atmospheric errors, multipath errors, receiver noise, etc.

However, according to the present invention, the pseudorange (R) is defined as:

$$R(t)=p(t)+dT+m(c-\dot{\phi})+\epsilon, \quad (1)$$

where m is the channel time error, c is the speed of light, and $\dot{\phi}$ is a known doppler error. The channel time error (m) may be defined as:

$$m=\Delta t2+\Delta t3.$$

In other words, the channel time error (m) is an integer number of milliseconds that when summed with the first time offset ($\Delta t1$), which is a value between zero and one millisecond, provides the amount of time between transmission by the satellite and reception by the receiver.

In general, the channel time error (m) and the first time offset ($\Delta t1$) will be different for each measurement and for each satellite. The present invention essentially forces the pseudoranges (R) for measurements for five satellites to have a common channel time error ($m_c$). As a result, if coarse estimates of user position and user time are known, accurate user position may be calculated by using the pseudorange (R) measurements.

More particularly, using Equation (1) and assuming that the error ($\epsilon$) is small, the pseudoranges (R) for five satellite measurements may be defined as:

$$R_1(t)=p_1(t)+dT+m_1(c-\dot{\phi}_1) \quad (2)$$

$$R_2(t)=p_2(t)+dT+m_2(c-\dot{\phi}_2) \quad (3)$$

$$R_3(t)=p_3(t)+dT+m_3(c-\dot{\phi}_3) \quad (4)$$

$$R_4(t)=p_4(t)+dT+m_4(c-\dot{\phi}_4) \quad (5)$$

$$R_5(t)=p_5(t)+dT+m_5(c-\dot{\phi}_5) \quad (6)$$

Thus, $$R_1(t)-p_1=dT+m_1(c-\dot{\phi}_1), \text{ and} \quad (7)$$

$$R_2(t)-p_2(t)=dT+m_2(c-\dot{\phi}_1). \quad (8)$$

Subtracting Equation (8) from Equation (7) provides:

$$(R_2(t)-p_2(t))-(R_1(t)-p_1(t))=c\cdot(m_2-m_1)-m_2\dot{\phi}_2-m_1\dot{\phi}_1. \quad (9)$$

Rearranging Equation (8) provides:

$$(m_2-m_1) = \frac{(R_2(t) - p_2(t)) - (R_1(t) - p_1(t))}{c} + \frac{(m_2\dot{\phi}_2 - m_1\dot{\phi}_1)}{c}. \quad (10)$$

However, $$\frac{(m_2\dot{\phi}_2 - m_1\dot{\phi}_1)}{c} << \frac{(R_2(t) - p_2(t)) - (R_1(t) - p_1(t))}{c}.$$

Thus, Equation (10) may be approximated as:

$$(m_2 - m_1) \approx nearestInteger\left(\frac{(R_2(t) - p_2(t)) - (R_1(t) - p_1(t))}{c}\right). \quad (11)$$

Note that the right side of Equation (11) is rounded to the nearest integer number of milliseconds. If the right side is not sufficiently close to an integer, it may be implied that there is a large error in either the estimated user position or user time. In one embodiment, if the right side of Equation (11) is greater than a predetermined threshold from the nearest integer, then an error may be detected and the algorithm discontinued.

According to the present invention, Equation (11) may be used to force equations (2) and (3) for $R_1$ and $R_2$ to have the common channel time error ($m_c$). The common channel time error ($m_c$) may be selected as any channel time error. As an example, the common channel time error ($m_c$) may be selected to be equal to $m_1$, and Equation (11) may be solved for $m_2$ and substituted into Equation (3) such that:

$$R_1(t)=p_1(t)+dT+m_c(c-\dot{\phi}_1), \text{ and} \quad (12)$$

$$R_2(t)=p_2(t)+dT+m_c(c-\dot{\phi}_2)+K_2, \text{ where} \quad (13)$$

$$K_2 = nearestInteger\left(\frac{(R_2(t) - p_2(t)) - (R_1(t) - p_1(t))}{c}\right) \cdot (c - \dot{\phi}_2). \quad (14)$$

As stated above, for this example, the common channel time error ($m_c$) is equal to $m_1$. $K_2$ is an offset term and may be computed based on known information, as described below in more detail. In this example, the pseudorange ($R_1$) has an offset term of zero. However, in another embodiment, the pseudorange ($R_1$) may have a non-zero offset term. In a similar fashion, Equations (4) through (6) may be forced to have the common channel time error ($m_c$), as shown in the following equations:

$$R_3(t)=p_3(t)+dT+m_c(c-\dot{\phi}_3), \quad (15)$$

$$R_4(t)=p_4(t)+dT+m_c(c-\dot{\phi}_4)+K_4, \text{ and} \quad (16)$$

$$R_5(t)=p_5(t)+dT+m_c(c-\dot{\phi}_5)+K_5 \quad (17)$$

where $$K_3 = \left(\frac{(R_3(t) - p_3(t)) - (R_1(t) - p_1(t))}{c}\right) \cdot (c - \dot{\phi}_3), \quad (18)$$

$$K_4 = \left(\frac{(R_4(t) - p_4(t)) - (R_1(t) - p_1(t))}{c}\right) \cdot (c - \dot{\phi}_4), \text{ and} \quad (19)$$

$$K_5 = \left(\frac{(R_5(t) - p_5(t)) - (R_1(t) - p_1(t))}{c}\right) \cdot (c - \dot{\phi}_5). \quad (20)$$

Further, if an estimate of the position of the receiver is known, estimates of the true ranges (p) may be computed using the following equations:

$$p_1(t)=\sqrt{((X_{S1}-X_U)^2+(Y_{S1}-Y_U)^2+(Z_{S1}-Z_U)^2)}, \quad (21)$$

$$p_2(t)=\sqrt{((X_{S2}-X_U)^2+(Y_{S2}-Y_U)^2+(Z_{S2}-Z_U)^2)}, \quad (22)$$

$$p_3(t)=\sqrt{((X_{S3}-X_U)^2+(Y_{S3}-Y_U)^2+(Z_{S3}-Z_U)^2)}, \quad (23)$$

$$p_4(t)=\sqrt{((X_{S4}-X_U)^2+(Y_{S4}-Y_U)^2+(Z_{S4}-Z_U)^2)}, \text{ and} \quad (24)$$

$$p_5(t)=\sqrt{((X_{S5}-X_U)^2+(Y_{S5}-Y_U)^2+(Z_{S5}-Z_U)^2)}, \quad (25)$$

where $X_U$, $Y_U$, $Z_U$ is a known estimate of the position of the receiver. The position of the first satellite ($X_{S1}$, $Y_{S1}$, $Z_{S1}$), the position of the second satellite ($X_{S2}$, $Y_{S2}$, $Z_{S2}$), the position of the third satellite ($X_{S3}$, $Y_{S3}$, $Z_{S3}$), the position of the fourth satellite ($X_{S4}$, $Y_{S4}$, $Z_{S4}$), and the position of the fifth satellite ($X_{S5}$, $Y_{S5}$, $Z_{S5}$) are known based on previously acquired ephemeris data and a known estimate of the satellite time, Z-count.

Using measurements of the pseudoranges ($R_1$ through $R_5$) and substituting Equations (21) through (25) for the true ranges (p) into Equations (14) and (18) through (20) for the values $K_2$ through $K_5$, the values $K_2$ through $K_5$ can be computed. Then, by substituting Equations (21) through (25) for the true ranges (p) into Equations (12), (13) and (15) through (17) for the pseudoranges (R), the following equations are provided:

$$R_1(t)=\sqrt{((X_{S1}-X_U)^2+(Y_{S1}-Y_U)^2+(Z_{S1}-Z_U)^2)}+dT+m_c(c-\dot{\phi}_1), \quad (26)$$

$$R_2(t)=\sqrt{((X_{S2}-X_U)^2+(Y_{S2}-Y_U)^2+(Z_{S2}-Z_U)^2)}+dT+m_c(c-\dot{\phi}_2)+K_2, \quad (27)$$

$$R_3(t)=\sqrt{((X_{S3}-X_U)^2+(Y_{S3}-Y_U)^2+(Z_{S3}-Z_U)^2)}+dT+m_c(c-\dot{\phi}_3)+K_3, \quad (28)$$

$$R_4(t)=\sqrt{((X_{S4}-X_U)^2+(Y_{S4}-Y_U)^2+(Z_{S4}-Z_U)^2)}+dT+m_c(c-\dot{\phi}_4)+K_4, \quad (29)$$

$$R_5(t)=\sqrt{((X_{S5}-X_U)^2+(Y_{S5}-Y_U)^2+(Z_{S5}-Z_U)^2)}+dT+m_c(c-\dot{\phi}_5)+K_5, \quad (30)$$

Thus, in Equations (26) through (30), there are five unknowns: $X_U$, $Y_U$, $Z_U$, dT, and m. Since there are five equations and five unknowns, Equations (26) through (30) may be solved using any mathematical algorithm such as, but not limited to, least squares to provide values for $X_U$, $Y_U$, $Z_U$, dT, and m, thereby computing the position of the receiver ($X_U$, $Y_U$, $Z_U$), the user clock error (dT), and the common channel time error ($m_c$).

As an alternative, differences may be used such that there are four equations and four unknowns. For example, assuming that the common channel time error ($m_c$) for each pseudorange measurement is forced to be equal to the channel time error ($m_1$) for the first pseudorange measurement, the system of equations may be defined as follows. Subtracting Equation (26) from Equation (27) provides:

$$R_2(t)-R_1(t)=\sqrt{((X_{S2}-X_U)^2+(Y_{S2}-Y_U)^2+(Z_{S2}-Z_U)^2)}+m_c(c-\dot{\phi}_2)+K_2-\sqrt{((X_{S1}-X_U)^2+(Y_{S1}-Y_U)^2+(Z_{S1}-Z_U)^2)}+m_c(c-\dot{\phi}_1)). \quad (31)$$

Subtracting Equation (26) from Equation (28) provides:

$$R_3(t)-R_1(t)=\sqrt{((X_{S3}-X_U)^2+(Y_{S3}-Y_U)^2+(Z_{S3}-Z_U)^2)}+m_c(c-\dot{\phi}_3)+K_3-\sqrt{((X_{S1}-X_U)^2+(Y_{S1}-Y_U)^2+(Z_{S1}-Z_U)^2)}+m_c(c-\dot{\phi}_1)). \quad (32)$$

Subtracting Equation (26) from Equation (29) provides:

$$R_4(t)-R_1(t)=\sqrt{((X_{S4}-X_U)^2+(Y_{S4}-Y_U)^2+(Z_{S4}-Z_U)^2)}+m_c(c-\dot{\phi}_4)+K_4-\sqrt{((X_{S1}-X_U)^2+(Y_{S1}-Y_U)^2+(Z_{S1}-Z_U)^2)}+m_c(c-\dot{\phi}_1)). \quad (33)$$

Subtracting Equation (26) from Equation (30) provides:

$$R_5(t)-R_1(t)=\sqrt{((X_{S5}-X_U)^2+(Y_{S5}-Y_U)^2+(Z_{S5}-Z_U)^2)}+m_c(c-\dot{\phi}_5)+K_5-\sqrt{((X_{S1}-X_U)^2+(Y_{S1}-Y_U)^2+(Z_{S1}-Z_U)^2)}+m_c(c-\dot{\phi}_1)). \quad (34)$$

Since the speed of light (c), doppler errors ($\dot{\phi}$), and the satellite positions ($X_S$, $Y_S$, $Z_S$) are known and $K_2$ through $K_5$ can be computed as described above, Equations (31) through (34) provide a system of equations having four equations and four unknowns: $X_U$, $Y_U$, $Z_U$, and $m_c$. Equations (31) through (34) may be solved using any mathematical algorithm such as, but not limited to, least squares. Note that by using the differences of the pseudoranges ($R_1$ through $R_5$), the user clock error (dT) is cancelled out of the Equations (31) through (34). This reduces the computational complexity for computing the user position ($X_U$, $Y_U$, $Z_U$). However, five pseudorange measurements (R) are still made.

Figure 3:
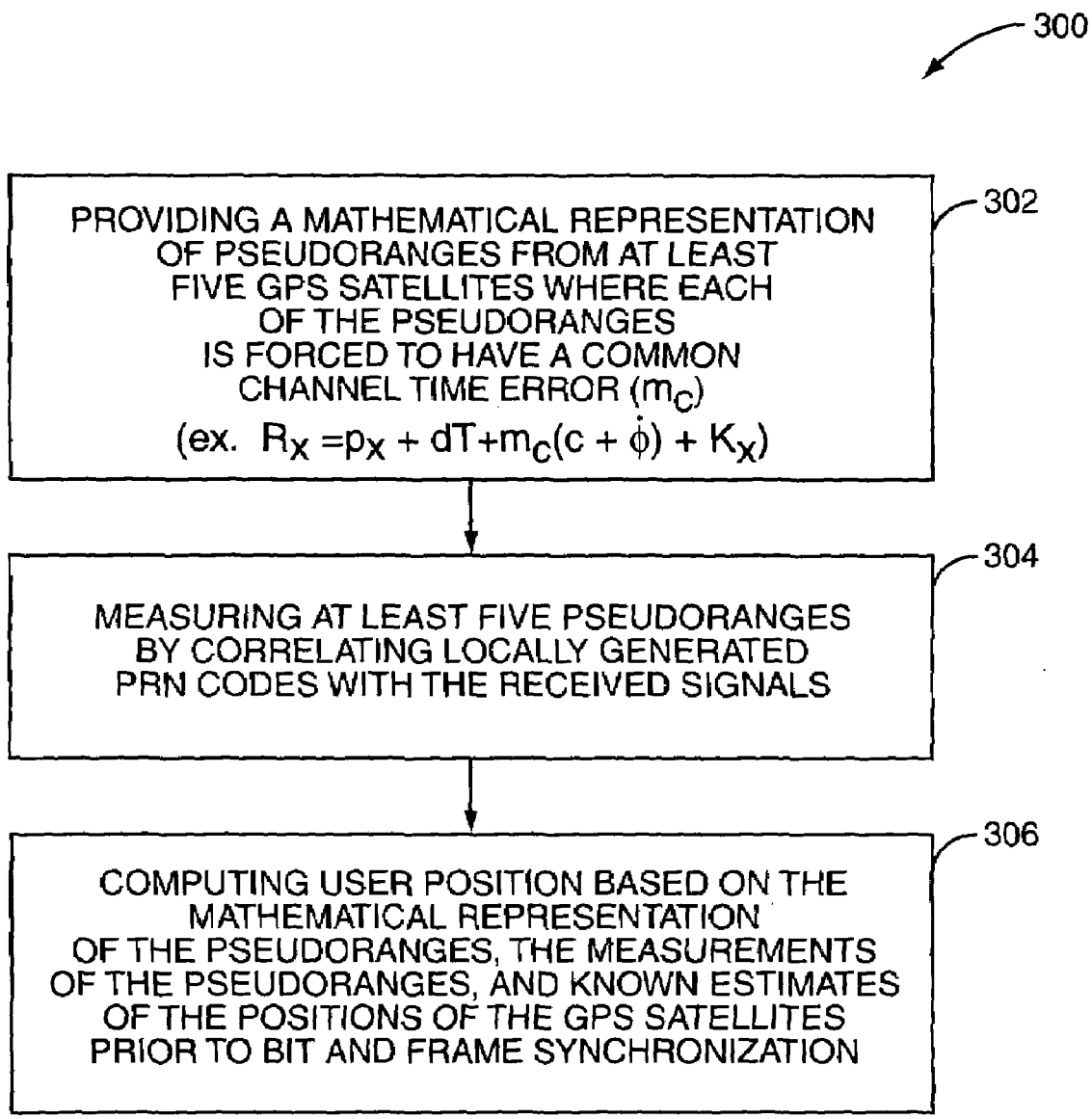
FIG. 3 is a flow chart illustrating a method for computing a location of a GPS receiver prior to bit and frame synchronization according to one embodiment of the present invention.

FIG. 3 is a flow chart illustrating a method 300 of computing user position prior to bit and frame synchronization according to one embodiment of the present invention. FIG. 3 is a generalization of the mathematical description of the method given above. First, a mathematical model of the pseudoranges (R) between the receiver and at least five GPS satellites is provided where the pseudoranges (R) are mathematically forced to have the common channel time error ($m_c$) (step 302). Note that, as stated above, four or more satellites may be used to calculate user position if user altitude is known, as will be apparent to one of ordinary skill in the art upon reading this disclosure. In one embodiment, step 302 corresponds to Equations (12)–(30) above. Next, measurements of at least five pseudoranges (R) are made using a correlation process where the locally generated PRN, or C/A, code is correlated with the received signals (step 304). Finally, the user position is computed based on the mathematical model of the pseudoranges (R), the measurements of the pseudoranges, and known estimates of the positions of the GPS satellites prior to performing bit and frame synchronization (step 306). In one embodiment, step 306 is performed by solving the system of equations defined by Equations (26)–(30). In another embodiment, step 306 is performed by solving the system of equations defined by Equations (30)–(33).

Those skilled in the art will recognize improvements and modifications to the preferred embodiments of the present invention. All such improvements and modifications are considered within the scope of the concepts disclosed herein and the claims that follow.

What is claimed is:

1. A method for computing a user parameter of a Global Positioning System (GPS) receiver comprising:
providing a mathematical model of pseudoranges from a number of GPS satellites, wherein each of the pseudoranges is forced to have a common channel time error, the common channel time error being an integer number of milliseconds; and
computing a user parameter based on the mathematical model of the pseudoranges, measurements of the pseudoranges, a known estimate of user position, and known positions of the number of GPS satellites.

2. The method of claim 1 wherein the user parameter is the user position.

3. The method of claim 1 wherein the user parameter is a user clock error of the GPS receiver.

4. The method of claim 1 further comprising:
measuring the pseudoranges from the number of GPS satellites by correlating locally generated Pseudo-Random Number (PRN) codes corresponding to each of the number of GPS satellites with signals received by the GPS receiver to provide the measurements of the pseudoranges.

5. The method of claim 1 wherein the number of GPS satellites is at least five GPS satellites.

6. The method of claim 1 wherein computing the user parameter comprises computing the user parameter prior to bit and frame synchronization.

7. The method of claim 1 wherein providing the mathematical model of the pseudoranges comprises providing an offset term for each of the pseudoranges in order to force each of the pseudoranges to have the common channel time error.

8. The method of claim 7 further comprising computing the offset term for each of the pseudoranges based on the known positions of the number of GPS satellites, the known estimate of the user position, and the measurements of the pseudoranges.

9. The method of claim 7 wherein providing the mathematical model comprises providing a mathematical model for each of the pseudoranges according to the following equation:

$$R_i(t) = \sqrt{((X_{Si}-X_U)^2+(Y_{Si}-Y_U)^2+(Z_{Si}-Z_U)^2)}+dT+m_c(c-\dot{\phi}_1)+K_i,$$

wherein $R_i$ is the pseudorange; $X_{Si}$, $Y_{Si}$, and $Z_{Si}$ define a known position of a corresponding one of the number GPS satellites; $X_U$, $Y_U$, and $Z_U$ define the user position; dT is an error of a clock of the GPS receiver; $m_c$ is the common channel time error; c is the speed of light; $\dot{\phi}_i$ is a known doppler error; and $K_i$ is an offset term used to mathematically force the pseudorange $R_i$ to have the common channel time error ($m_c$).

10. The method of claim 9 further comprising computing the offset term ($K_i$) for each of the pseudoranges based on the known estimate of the user position, the known positions of the number of GPS satellites, and the measurements of the pseudoranges.

11. The method of claim 10 wherein computing the offset term ($K_i$) comprises computing a difference of an actual channel time error for the pseudoranges and the common channel time error ($m_c$), wherein the common channel time error ($m_c$) is the actual channel time error for one of the pseudoranges.

12. The method of claim 11 wherein computing the difference of the actual channel time error for the pseudoranges and the common channel time error ($m_c$) comprises computing the difference based on the following equation:

$$(m_i - m_c) = \frac{(R_i(t) - p_i(t)) - (R_c(t) - p_c(t))}{c},$$

wherein $m_i$ is the actual channel time error for the pseudorange; $R_i$ is the measurement of the pseudorange; $p_i$ is a true range computed based on a known estimate of the position of a corresponding one of the number of GPS satellites and the known estimate of the user position; $R_c$ is the measurement of the one of the pseudoranges having the actual channel time error corresponding to the common channel time error ($m_c$); and $p_c$ is a true range computed based on the known position of a corresponding one of the number GPS satellites and the known estimate of the user position.

13. A Global Positioning System (GPS) receiver that computes a user parameter, the GPS receiver comprising:

a processor adapted to compute a user parameter based on measurements of pseudoranges for a number of GPS satellites, known positions of the number of GPS satellites, a known estimate of user position, and a mathematical model of the pseudoranges that forces each of the pseudoranges to have a common channel time error, the common channel time error being an integer number of milliseconds.

14. The GPS receiver of claim 13 wherein the user parameter is the user position.

15. The OPS receiver of claim 13 wherein the user parameter is a user clock error of the GPS receiver.

16. The GPS receiver of claim 13 further comprising:

a correlator adapted to provide the measurements of the pseudoranges from the number of GPS satellites by correlating locally generated Pseudo-Random Number (PRN) codes corresponding to the number of GPS satellites with signals received by the GPS receiver.

17. The GPS receiver of claim 13 wherein the number of GPS satellites is at least five GPS satellites.

18. The GPS receiver of claim 13 wherein the processor is further adapted to compute the user parameter prior to bit and frame synchronization.

19. The GPS receiver of claim 13 wherein the mathematical model of the pseudoranges comprises an offset term for each of the pseudoranges in order to force each of the pseudoranges to have the common channel time error.

20. The GPS receiver of claim 19 wherein the processor is further adapted to compute the offset term for each of the pseudoranges based on the known positions of the number GPS satellites, the known estimate of the user position, and the measurements of the pseudoranges.

21. The GPS receiver of claim 19 wherein the mathematical model comprises a mathematical model for each of the pseudoranges defined by the following equation:

$$R_i(t) = \sqrt{((X_{Si}-X_U)^2+(Y_{Si}-Y_U)^2+(Z_{Si}-Z_U)^2)}+dT+m_c(c-\dot{\phi}_1)+K_i,$$

wherein $R_i$ is the pseudorange; $X_{Si}$, $Y_{Si}$, and $Z_{Si}$ define a known position of a corresponding one of the number of GPS satellites; $X_U$, $Y_U$, and $Z_U$ define the user position; dT is an error of a clock of the GPS receiver; $m_c$ is the common channel time error, c is the speed of light; $\dot{\phi}_i$ is a known doppler error; and $K_i$ is an offset term used to mathematically force the pseudorange $R_i$ to have the common channel time error ($m_c$).

22. The GPS receiver of claim 21 wherein the processor is further adapted to compute the offset term ($K_i$) for each of the pseudoranges based on the known estimate of the user position, the known positions of the number of GPS satellites, and the measurements of the pseudoranges.

23. The GPS receiver of claim 22 wherein the processor is further adapted to compute the offset term ($K_i$) based on a difference of an actual channel time error for the pseudoranges and the common channel time error ($m_c$), wherein the common channel time error ($m_c$) is the actual channel time error for one of the pseudoranges.

24. The GPS receiver of claim 23 wherein the processor is further adapted to compute the offset term ($K_i$) based on computing the difference of the actual channel time error for the pseudoranges and the common channel time error ($m_c$) based on the following equation:

$$(m_i - m_c) = \frac{(R_i(t) - p_i(t)) - (R_c(t) - p_c(t))}{c},$$

wherein $m_i$ is the actual channel time error for the pseudorange; $R_i$ is the measurement of the pseudorange; $p_i$ is a true range computed based on the known position of a corresponding one of the number of GPS satellites and the known estimate of the user position; $R_c$ is the measurement of the one of the pseudoranges having the actual channel time error corresponding to the common channel time error ($m_c$); and $p_c$ is a true range computed based on the known position of a corresponding one of the number of GPS satellites and the known estimate of the user position.

* * * * *

UNITED STATES PATENT AND TRADEMARK OFFICE
CERTIFICATE OF CORRECTION

| | | |
|---|---|---|
| PATENT NO. | : 7,064,709 B1 | Page 1 of 1 |
| APPLICATION NO. | : 11/082276 | |
| DATED | : June 20, 2006 | |
| INVENTOR(S) | : Weisenburger et al. | |

It is certified that error appears in the above-identified patent and that said Letters Patent is hereby corrected as shown below:

column 10, at line 12, please replace "OPS" with --GPS--.

Signed and Sealed this

Twenty-ninth Day of August, 2006

JON W. DUDAS
*Director of the United States Patent and Trademark Office*